Oct. 1, 1957  J. CASALINO  2,808,090
DOUBLE WALL CONTAINER
Filed April 11, 1955
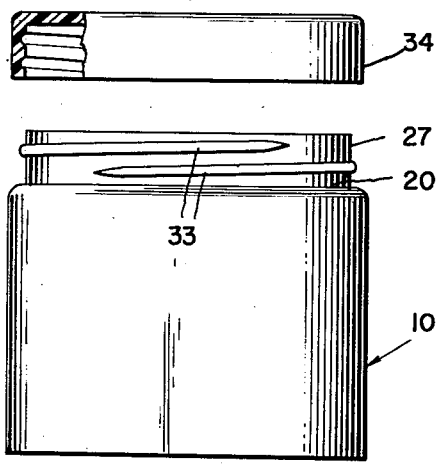
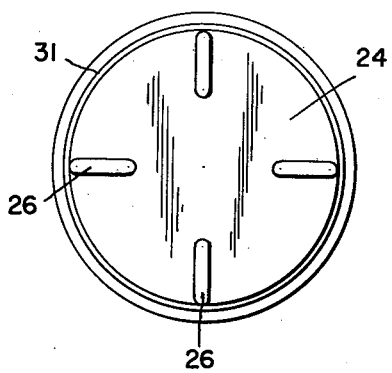
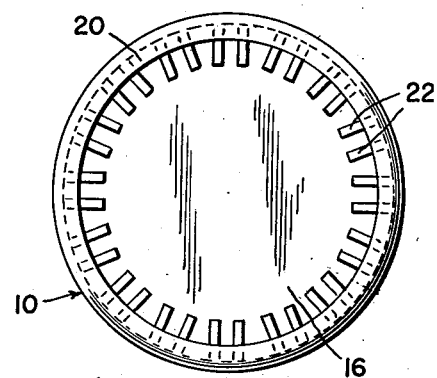
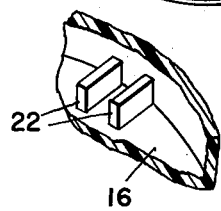
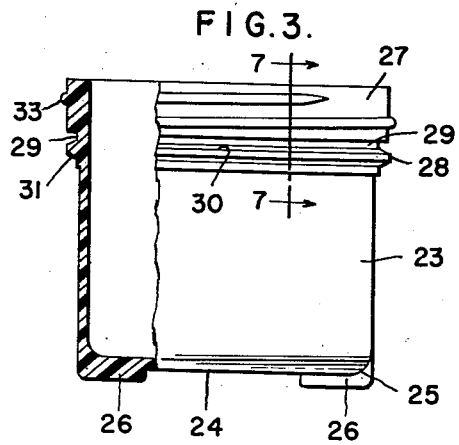
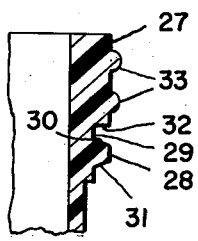
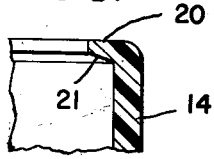
Inventor
Joseph Casalino
By Shoemaker & Mattare
ATTYS.

United States Patent Office 2,808,090
Patented Oct. 1, 1957

2,808,090

DOUBLE WALL CONTAINER

Joseph Casalino, Forest Hills, N. Y., assignor to Plastic Molded Arts Corp., Long Island City, N. Y., a corporation of New York Application April 11, 1955, Serial No. 500,388

9 Claims. (Cl. 150—0.5)

This invention relates to improvements in jars, pots and like receptacles intended to contain ointments, salves, cold creams and similar medicinal, cosmetic or other preparations of like consistency and also dry preparations such as powders and the like.

More specifically the present invention is directed to new and useful improvements in jars, pots and the like formed of plastic materials of the synthetic resin class such, by way of example, as polyethylene.

Pots and jars designed to contain ointments and the like have heretofore been made in more or less standard form and in standard sizes, of molded glass and such articles are conventionally of heavy or thick wall construction in order to withstand repeated handling without breakage.

The formation or molding of solid wall pots and jars of synthetic resins having the capacities and external dimensions corresponding to those molded of glass, presents certain technical difficulties well understood by those versed in the art of forming molded plastic bodies, and it is accordingly a particular object of the present invention to provide a new and novel construction in plastic or synthetic resin pots or jars which may be made to have the overall dimensions of conventional pots or jars but with walls of hollow form whereby an economical advantage is had by reducing the amount of the relatively expensive plastic material required and a light weight but substantially constructed article is obtained.

Another object of the invention is to provide, in a manner as hereinafter set forth, a hollow wall pot, jar or the like of synthetic resin material wherein the article is initially produced in two molded units, with a new and novel means for joining the same in assembled relation.

Still another object of the invention is to provide a new plastic or synthetic resin receptacle of hollow wall form by the use of two molded members, each complete and finished in itself, and wherein such members are formed to be inserted one into the other and to interlock in such a manner as to give the pot or jar the appearance of being of one-piece construction by reason of the absence of any apparent line of demarcation between the joined members.

A further object of the invention is to provide a new plastic or synthetic resin receptacle of hollow wall form embodying two interengaged molded members wherein a novel coupling, or interlocking means, is provided between the members which, in being effected, utilizes the elastic yielding characteristics of the polyethylene plastic for establishing and maintaining the coupling or interlocking connection.

A still further object of the invention is to provide a new plastic or synthetic resin receptacle of hollow wall form embodying two cup-like molded members fitted one into the other and wherein a novel locking coupling means is provided between the members comprising two coacting elements carried by the members and formed so that the element of one member is drawn into tight encircling engagement with and around the other member to form a substantially invisible joint.

Yet another object of the invention is to provide in a manner as hereinafter set forth, for cooperation with the locking coupling means of the character above described, additional novelly designed interengaging means carried by the members for retaining the same against relative rotation after assembly.

The foregoing and other objects are attained by the provision of an outer cylindrical open top body and an inner receptacle or cup-like member designed to be inserted into the outer member. The outer member is provided with an inturned locking flange having an inclined or tapered under face and the inner member is provided with an encircling rib having sloping upper and under surfaces, the upper surface being spaced from a threaded annular top part providing a channel into which the locking flange is engaged when the inner member is inserted into the outer member. The inside diameter of the flange is approximately equal to the diameter of the bottom of the channel and the flexible character of the plastic material of which the members are formed facilitates the flexing of the flange sufficiently to permit the latter to snap into the channel which encircles the upper part of the inner member. The inclined under face of the rib also assists in this flexing action in the assembly of the members and the inclined upper face of the rib cooperating with the inclined under face of the flange forming a part of the outer member or receptacle draws the edge of the flange tightly into the channel to form a tight and substantially invisible joint between the members.

Additional means is provided for preventing relative rotary movement between the inner and outer members comprising radial ribs carried on the bottom of the inner member and projecting downwardly therefrom with a multiplicity of pairs of spaced ribs formed integral with the bottom of the outer member between certain of which pairs of spaced ribs the ribs of the inner member engage when the two members are put together in assembled relation.

The invention will be best understood from a consideration of the following detail description taken in connection with the accompanying drawing forming part of the specification, with the understanding that slight changes or modifications may be made in the invention so long as such changes or modifications mark no material departure from the salient features of the invention as expressed in the appended claims.

In the drawings:

Fig. 1 is a view in side elevation of a jar or pot constructed in accordance with the present invention and showing a conventional type of cap therefor, the cap being partly in section;

Fig. 2 is a view in vertical transverse section through the outer member of the pot showing the inner cup member in elevation;

Fig. 3 is a view partly in side elevation and partly in vertical section of the inner or cup member;

Fig. 4 is a bottom plan view of the cup member;

Fig. 5 is a top plan view of the outer or shell mmeber;

Fig. 6 is a fragmentary detail showing a pair of locking ribs;

Fig. 7 is a sectional view on an enlarged scale taken substantially on the line 7—7 of Fig. 3; and Fig. 8 is a detail section on an enlarged scale through the top edge of the shell member.

Referring now more particularly to the drawing, it will be seen that the body of the receptacle in the form of a pot or jar comprises two separate parts or members which are designated 10 and 12, the member 10 comprising the outer member or shell and the member 12 comprising the inner receptacle.

As hereinbefore set forth, this pot or jar is formed of a suitable plastic material and by the use of the term "plastic" is meant any synthetic resin suitable for the purpose. In this connection the plastic polyethylene is preferred but it is to be understood that while this has been found to be the most satisfactory to give the best results, the invention is not limited to the use of this plastic or synthetic resin.

The two members making up the article are individually molded and each is complete in itself and the one is introduced into and locked to the other without the employment of accessory securing elements.

The outer member or shell 10 comprises the circular or cylindrical wall 14 having one end closed to form the solid bottom 16. The wall 14 is preferably of constant or uniform thickness throughout and the top edge is turned or continued inwardly in the form of an inside flange or collar 18. This collar 18 has a flat top face 20 while the under side or under face is sloping or tapered slightly toward the edge as indicated at 21.

Molded integrally with the inner side of the bottom 16 is a plurality of short pairs of spaced locking ribs 22. These pairs of ribs are arranged in closely spaced relation around the inner surface of the wall 14 and are joined at their outer ends with the wall and extend inwardly therefrom as illustrated, being also joined in the molding operation with the bottom 16, as hereinbefore stated. The ribs of each pair are arranged so that a central line passing therebetween is radial to the bottom 16 of the shell and these radial lines are equidistantly spaced around the entire circumference of the wall 14 as is clearly shown, there being preferably approximately 16 sets of the locking ribs in all.

The cup-like inner member 12 comprises the circular wall portion 23 having the bottom 24, the circular corner joining the bottom and side wall being widely or generously rounded as indicated at 25.

The bottom wall 24 has formed integral therewith in the molding operation the four locking lugs 26 which are equidistantly spaced around the bottom and each of which extends from the plane of the outer wall radially inwardly. Each of these lugs is of a length slightly greater than the length of the pairs of ribs between which they are designed to engage in the assembled structure as hereinafter described.

The cup-like inner member is of smooth or straight wall form in its inner surface while the exterior thereof is defined by the relatively wide top or head band 27.

Encircling the inner body 12 beneath the head band is a locking ring 28 which is spaced from the lower edge of the band 27 to form the encircling locking channel 29. The overall diameter of the locking ring 28 is the same as the overall or outside diameter of the band 27 and the diameter of the bottom of the channel or groove 29 is approximately equal to the diameter of the opening defined by the flange 18.

The ring 28 has an inclined or sloping top face 30 and an oppositely sloping under face 31. In other words, the faces 30 and 31 are in outwardly convergent relation. The channel is defined at the upper side, opposite from the sloping surface 30 of the locking ring, by a flat radial face 32 and the width of the channel between the faces 30 and 32 approximates the thickness of the flange 18 which is engaged therein in the assembled pot or receptacle.

As is readily seen, the overall or outside diameter of the inner member 12 is materially less than the inside diameter of the shell 10 and in fact is less than the diameter of the locking channel or groove 29 and the overall diameter of the locking ring 28 is slightly less than the inside diameter of the shell wall 14.

Above the locking channel or groove 29 the head band 27 is provided with a molded thread rib 33 for coaction with corresponding threads or other means carried by a closure cap 34 of conventional form and which may be molded of plastic of similar character to that used in the body of the receptacle or any other suitable plastic or any other material which will form a cap of desired character.

As hereinbefore stated, the two members 10 and 12 making up the completed pot or container are molded separately and individually of the desired plastic, preferably polyethylene, and are then assembled by inserting the inner cup-like member 12 into the outer member. The locking connection between the members primarily by means of the interengagement of the flange 18 in the channel or groove 29 is effected by pressing directly inwardly on the top of the inner member 12 so that the top face of the flange 18 will press against the outwardly and upwardly inclined under surface 31 of the lock ring 28 and be flexed downwardly or inwardly and at the same time will be caused to ride outward on such under surface 31 until the edge of the flange slides across the outer face of the locking rib whereupon the inherent elasticity of the plastic material will cause the flange to snap back to its substantially right angular relation with the wall 14 and enter the locking groove 29. In entering the locking groove the inclined under face 21 of the tapered flange will slide inwardly and upwardly along the top face 30 of the locking ring so that the flange will enter the groove and contract around and in tight gripping relation with the bottom wall of the groove and the flat top face of the flange will be pressed tightly against the flat under face 32 or wall surface forming the upper side of the locking groove. Since, as above stated, the thickness of the flange 18 conforms with the width of the locking channel or groove 29 from the bottom thereof outwardly to the outer side locking ring, it will be seen that when the flange is thus engaged in the groove or channel a very tight joint will be effected and in the use of the plastic material named or referred to the line of joinder between the top of the locking flange and the head band will be substantially invisible.

Simultaneously with the coupling of the inner and outer members together in the manner stated, that is, in effecting the locking engagement of the flange 18 in the locking channel or groove 29, the locking lugs 26 will each enter between a pair of locking ribs 22 or if the position of the inner member is such that the lugs do not immediately enter between the pairs of ribs but engage on the tops of the ribs, a slight turning of one member with respect to the other will cause the lugs to ride over the ribs to the position where each lug can snap down in between two ribs. The flexible or resilient character of the plastic material will permit this action. It will be seen upon reference to Fig. 2 that the height of the inner member between the bottom 24 thereof and the locking channel or groove 29 is considerably less than the interior height of the outer member or shell 10 so that the bottom 24 of the inner member clears the tops of the ribs 22 and also the locking lugs 26 may clear the bottom 16 of the outer member or shell. However, if desired, the dimensions of the two parts may be so proportioned or worked out as to bring the bottom 24 of the inner member against the tops of the ribs 22 and also bring the bottom edges of the lugs 26 against the bottom 16 of the outer member. Also the thickness of the lugs 24 may be such as compared to the spacing between the ribs of each pair that a tight engagement will be effected when the lug enters between a pair of ribs.

By the provision of the interlocking lugs and ribs it will also be seen that in the action of screwing on the cover or lid or unscrewing the latter while holding the outside shell, no difficulty will be experienced in disengaging the cover because of the rotation of the inner member relative to the outer member since such rotation is effectively prevented by the interengaging lugs and ribs. It will also be seen that when the cover or cap is placed on the receptacle and screwed down by means of the threads 33, the bottom edge of the cap will come into contact with and press against the top of the flange thereby forming a tight seal between these parts.

From the foregoing it will be seen that there is provided by the present invention a plastic container or receptacle in the form of a conventional ointment or cosmetic pot or jar wherein the parts are so designed in a novel manner that after being removed from the forming mold they can be easily and quickly assembled and tightly locked together merely by the action of forcing the inner member 12 into the outer member until the locking flange 18 snaps into the locking groove or channel 29. This action completes the locking coupling between the parts and avoids the use of any auxiliary elements by which to join or secure the parts together.

Due to the novel manner in which the locking flange 18 is set or engaged in the locking groove or channel 29, a substantially air tight joint will be effected, thereby setting up in the area A between the side and bottom walls of the inner and outer members a dead air space which will have a certain insulation value and, therefore, prevent substances such as cold cream, petrolatum or other similar material which is easily melted from being affected in the event that the receptacle is placed near a warm object such as a radiator or the like.

I claim:

1. A receptacle of the type described, comprising an outer member embodying a side wall, a bottom and a top opening, an inner cup member having its major lower portion extending into the outer member through the said top opening and having a top portion extending outwardly through and beyond said top opening and formed to have a closure attached thereto, and an interlocking coupling between said members comprising a circular elastic flange carried by one member and a circular locking groove in the other member into which said flange is insertable by reason of its elasticity and in which the flange is tightly engaged.

2. A receptacle of the type described, comprising a cylindrical outer shell member having a top opening and a cylindrical cup member having a lower body portion extending into the shell member through the top opening thereof and having a top portion, said top portion being encircled by the perimeter of said top opening and adapted to receive a closure cap, the said lower body portion being spaced from the interior of the shell member, means forming a locking groove around the outside of the cup top portion, and a locking flange defining the top opening of the shell member and seated tightly in said groove, said flange having an inherent elastic character whereby its locking engagement in the locking groove is effected and maintained.

3. The invention according to claim 2, wherein said members are formed of a plastic having an inherent elasticity and said elasticity facilitating the passage of the flange into and its maintenance in the locking groove.

4. A receptacle of the type described comprising an outer shell member having a side wall, a bottom wall and a top opening, a cup member having a lower portion extending into the shell member through said opening and a top outside band portion lying above the shell top opening, said band portion being designed to receive a closure cap, means forming a locking groove in and encircling the cup member below said band, an inturned locking flange defining said shell member top opening, the circumference of the opening defined by the flange being the same as the circumference of the bottom of the groove, the lower portion of the cup-member below said groove being spaced from the shell member, and said flange having an inherent elasticity whereby its engagement and maintenance in the groove is effected.

5. A receptacle of the type described comprising an outer shell member having a side wall, a bottom wall and a top opening, a cup member having a lower portion extending into the shell member through said opening and a top outside band portion lying above the shell top opening, said band portion being designed to receive a closure cap, means forming a locking groove in and encircling the cup member below said band, the lower face of said band portion forming the upper wall of said groove, the lower wall of the groove slanting downwardly, an inturned elastic locking flange having a configuration in transverse section conforming to and of the same dimensions as the groove and defining the shell member top opening, the circumference of the opening defined by the flange being the same as the circumference of the bottom of the groove, the portion of the cup member lying within the shell member being spaced from the shell member, and said flange fitting tightly in said groove.

6. A receptacle of the type described comprising an outer shell member having a side wall, a bottom wall and a top opening, a cup member having a lower portion extending into the shell member through said opening and a top outside band portion lying above the shell top opening, said band portion being designed to receive a closure cap, a locking ring encircling the cup member below and spaced from the lower face of said band and forming with said band face a locking groove, the top side of the ring forming the lower wall of the groove and sloping downwardly and outwardly, the under side of the ring sloping upwardly and outwardly, an inturned locking flange defining the shell member opening and having in transverse section a configuration and dimensions conforming to the configuration and dimensions of said locking groove, the circumference of the opening defined by the flange being the same as the circumference of the bottom of the groove, said flange fitting tightly in said groove, and said flange having an inherent elasticity and coacting with said sloping sides of the ring whereby engagement and maintenance of the flange in the groove is effected.

7. A hollow wall receptacle, comprising nested outer and inner members of molded polyethylene, the outer member embodying a side wall and bottom wall and having a top opening, an inwardly projecting flange defining the opening, the inner member forming a cup embodying a side wall and a bottom wall, the side wall including an encircling outside band, the inner member having the portion below said band within and spaced from the side and bottom walls of the outer member, the inner member having an encircling locking groove below the band in which said flange is fitted, and interengaging element carried by and between the opposing faces of the bottom walls and securing the members against relative rotation.

8. The invention according to claim 7, wherein those elements carried by the bottom wall of the outer member comprise a number of pairs of spacer short substantially radial ribs and the elements carried by the cup member comprise radially extending lugs each adapted to engage between a pair of ribs.

9. The invention according to claim 7, wherein those elements carried by the bottom wall of the outer member comprise a number of closely positioned pairs of spaced short substantially radial ribs extending inwardly from the side wall of the outer member and the elements carried by the cup member bottom wall comprise short lugs extending radially inwardly from the outer edge of the cup member bottom wall and each engaging between a pair of ribs.

References Cited in the file of this patent

UNITED STATES PATENTS

| 1,692,969 | Van Voorhis | Nov. 27, 1928 |
| 2,072,630 | Ferry | Mar. 2, 1935 |
| 2,074,231 | Meacham | Mar. 16, 1937 |
| 2,591,578 | McNealy et al. | Apr. 1, 1952 |
| 2,679,875 | Baldanza | July 1, 1954 |
| 2,706,065 | Stone | Apr. 12, 1955 |
| 2,711,766 | Archer et al. | June 28, 1955 |
| 2,776,691 | Tupper | Jan. 8, 1957 |

FOREIGN PATENTS

| 221 | Great Britain | Jan. 5, 1914 |